March 23, 1937.  W. F. OLIVER  2,074,416
DUPLEX FLUID BRAKING SYSTEM
Filed Dec. 28, 1935
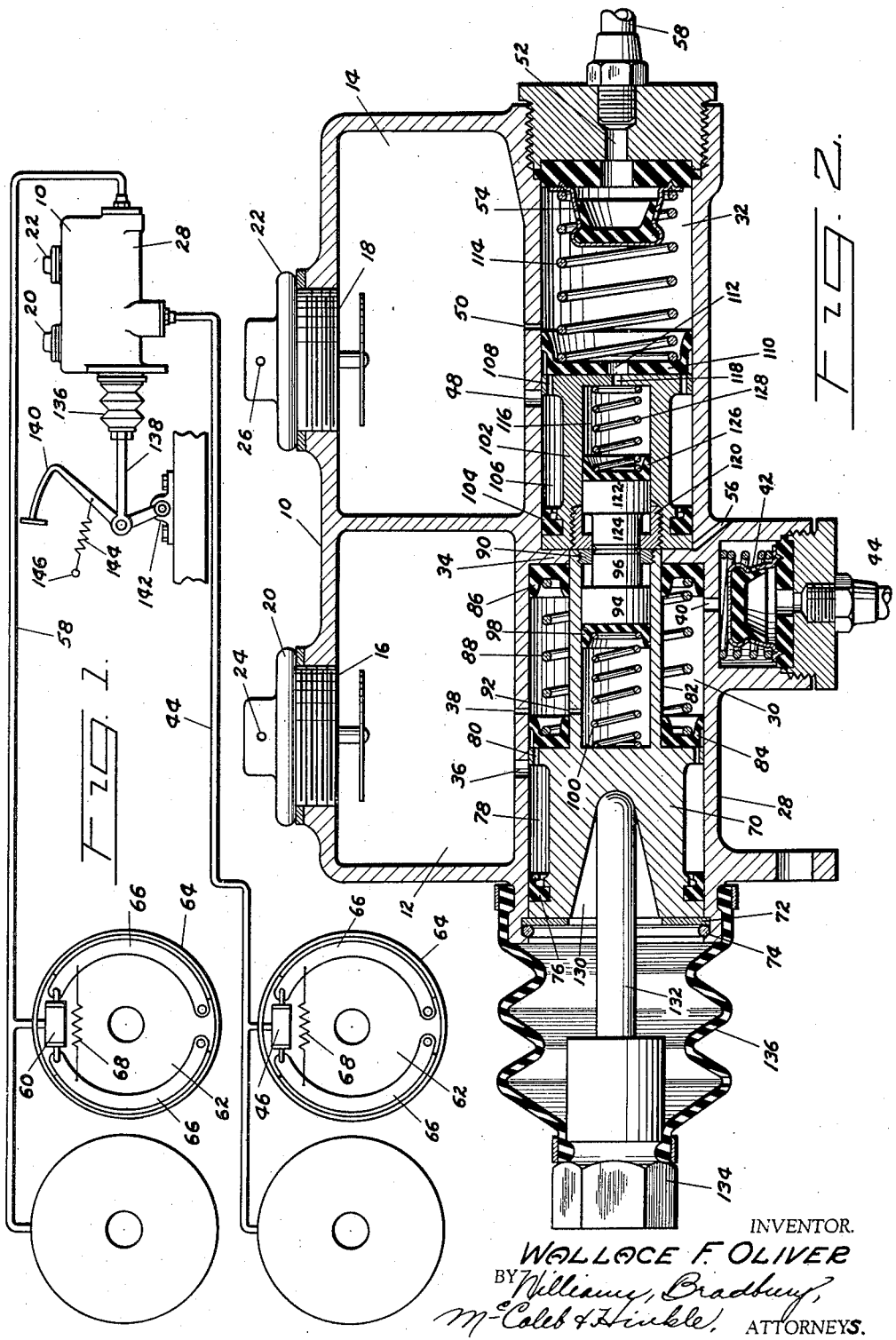
INVENTOR.
WALLACE F. OLIVER
BY Williams, Bradbury,
McCaleb & Hinkle, ATTORNEYS.

Patented Mar. 23, 1937

2,074,416

UNITED STATES PATENT OFFICE 2,074,416

DUPLEX FLUID BRAKING SYSTEM

Wallace F. Oliver, Detroit, Mich., assignor to Hydraulic Brake Company, Detroit, Mich., a corporation of California Application December 28, 1935, Serial No. 56,489

9 Claims. (Cl. 60—54.5)

This invention relates to brakes for motor vehicles, and more particularly to a duplex fluid braking system.

The invention comprehends independent fluid pressure systems and means for compensating for a differential of pressure in the systems.

An object of the invention is to provide a fluid pressure braking system including a duplex fluid pressure producing device.

Another object of the invention is to provide separate fluid pressure braking systems including an actuating device connected to operate the systems in unison to compensate for a differential of pressure in the systems and to maintain one of the systems operative in the event of failure of the other system.

Other objects of the invention will appear from the following description taken in connection with the drawing which forms a part of this specification, and in which,—

Fig. 1 is a schematic view of a duplex fluid pressure braking system embodying the invention; and Fig. 2 is a vertical sectional view of a fluid pressure producing device.

Referring to the drawing for more specific details of the invention, 10 represents a reservoir including two separate compartments or containers 12 and 14 provided with filling openings 16 and 18 which may be closed by plugs 20 and 22 having openings 24 and 26 for venting the containers 12 and 14 to the atmosphere.

A compound cylinder 28 formed at the base of the reservoir includes a large cylinder 30 and a small cylinder 32. The cylinders are arranged concentrically with relation to one another and are divided by an apertured diaphragm 34. The cylinder 30 has ports 36 and 38, providing communications between the cylinder and the container 12 of the reservoir, and a discharge port 40 controlled as by a two-way valve 42. A fluid pressure delivery pipe or conduit 44 connected to the valve 42 has branches connected respectively to fluid pressure actuated motors 46 for actuating the friction elements or brakes.

Similarly, the cylinder 32 has ports 48 and 50 providing communications between the cylinder and the container 14 of the reservoir, a discharge port 52 controlled by a two-way valve 54, and a vent 56 adjacent to the diaphragm 34. A fluid pressure delivery pipe or conduit 58 connected to the valve 54 has branches connected respectively to fluid pressure actuated motors 60 for the actuation of friction elements or brakes.

The motors 46 and 60 are arranged in pairs, one pair for the actuation of the brakes associated with the front wheels of a vehicle, and the other pair for actuating the brakes associated with the rear wheels of the vehicle. The brakes may be of any conventional type including a fixed support or backing plate 62, a rotatable drum 64 associated therewith, interchangeable friction elements or shoes 66 pivoted on the backing plate, and a motor corresponding to the motors 46 and 60 arranged on the backing plate and operative to move the shoes into engagement with the drums against the resistance of a retractile spring 68 connecting the shoes of the respective brakes.

A piston 70 reciprocable in the cylinder 30 is held against displacement by a washer 72 seated on an annular shoulder in the open end of the cylinder and secured in position by a retaining ring 74 seated in a continuous groove in the wall of the cylinder. The skirt of the piston has a groove for the reception of a leak-proof cup 76 which provides against seepage of fluid from the cylinder past the piston, and the body of the piston has a section reduced in diameter to provide, in conjunction with the wall of the cylinder, a chamber 78 communicating with the container 12 of the reservoir by way of the port 36. The head of the piston is provided with a plurality of spaced openings or ports 80 providing communications between the annular chamber 78 and that portion of the cylinder forward of the piston.

A sleeve 82 formed concentrically on the head of the piston is received by the aperture in the diaphragm 34, and a collapsible leak-proof cup 84 slipped over the sleeve 82 seats on the head of the piston for control of the ports 80. A leak-proof cup 86, also slipped on the sleeve, seats on the diaphragm 34 to provide against seepage of fluid from the cylinder 30 to the cylinder 32, and a spring 88 interposed between the cups serves to retain them in position and also to return the piston to its retracted position.

The forward end of the sleeve 82 is closed by an apertured head 90, and the sleeve has a port 92 providing a communication between the interior of the sleeve and the cylinder 30. A piston 94, reciprocable in the sleeve, has a concentric stem 96 received by the aperture in the head 90, and a leak-proof cup 98 on its head is held against displacement by a spring 100 interposed between the cup and the head of the piston 70.

A piston 102, reciprocable in the cylinder 32, seats on the diaphragm 34 when in retracted position. The skirt of the piston carries a leak-proof washer 104 providing against seepage of fluid from the cylinder past the piston. The body of the piston has a section reduced in diameter to provide an annular chamber 106 communicating with the compartment 14 of the reservoir by way of the port 48, and the head of the piston has a plurality of spaced ports 108 providing communications between the annular chamber 106 and that portion of the cylinder 32 forward of the piston. A collapsible leak-proof cup 110 seated on the head of the piston controls the ports 108. This cup is provided with a concentric opening 112, the object of which will hereinafter appear, and a spring 114 interposed between the cup and the two-way valve 54 serves to retain the cup and the valve in position and also to return the piston 102 to its retracted position.

The body of the piston is axially bored to provide a chamber 116 having a port 118 registering with the opening 112 in the collapsible leak-proof cup 110 to provide for communication between the chamber 116 and the cylinder 32. A head 120 threaded in the chamber 116 abuts the sleeve 82 and the head 90 of the sleeve 82. The head 120 has an aperture registering with the aperture in the head 90 of the sleeve 82. A piston 122 reciprocable in the chamber 116 has a concentric stem 124 received by the aperture in the head 120 and abuts the stem 96 of the piston 94, and a leak-proof cup 126 on the head of the piston 122 is held against displacement by a spring 128 imposed between the cup and the back of the head of the piston 102. The tensile strength of the spring 128 is the same as the tensile strength of the spring 100, so as to normally balance the pistons 94 and 122.

The piston 70 has a recess 130 for the reception of one end of a thrust pin 132, the other end of which is provided with a coupling 134 connected as by a flexible boot 136 to the open end of the cylinder 30 for the exclusion of dust and other foreign substances from the cylinder, and a rod 138 connects the coupling 134 to a foot pedal lever 140 pivoted on a suitable support 142 and connected by a retractile spring 144 to a fixed support 146.

In a normal operation, when the foot pedal lever 140 is depressed to apply the brakes, force is transmitted therefrom through the rod 138 and the thrust pin 134 to the piston 70, resulting in moving the piston 70 on its compression stroke, the piston 70 carrying with it the piston 102.

During the initial movement of these pistons on their compression strokes, the collapsible leak-proof cups 84 and 110 on the heads of the respective pistons close the ports 38 and 50 so as to cut off communication between the cylinders 30 and 32 and the respective containers 12 and 14 of the reservoir, and upon further movement of the pistons 70 and 102 on their compression strokes fluid in the cylinders 30 and 32 is displaced therefrom past the two-way valves 42 and 54, through the fluid pressure delivery pipes or conduits 44 and 58 and their respective branches, into the fluid pressure actuated motors 46 and 60, energizing these motors with the resultant movement of the shoes 66 into engagement with the drums 64 against the resistance of retractile springs 68.

Upon release of the foot pedal lever 140 the retractile spring 114 returns this lever to its normal position and retracts the thrust pin 138. As the foot pedal lever moves to its normal position, the pistons 70 and 102 return to their retracted positions under the influence of the springs 88 and 114, and as the pistons move to their retracted positions a partial vacuum is created in the cylinders 30 and 32 with the result that fluid is drawn from the containers 12 and 14 of the reservoir through the ports 36 and 48, the annular chambers 78 and 106, and through the ports 80 and 108 in the heads of the pistons 70 and 102, past the collapsible cups 84 and 110 on the heads of the pistons into those portions of the respective cylinders 30 and 32 forward of the pistons. During this movement fluid is returned to the cylinders 30 and 32 from the motors 46 and 60 under the influence of retractile springs 68 connecting the shoes of the respective brakes.

Under normal conditions of operation the pressure developed in the respective cylinders 30 and 32 and the motors 46 and 60, respectively connected to these cylinders, is substantially equal, and thus the friction elements of the respective brakes connected to these motors are actuated with equal force and effect.

Due to the size of the sleeve 82 in the cylinder 30, the cylinders 30 and 32 have the same capacity, and because of an equalized pressure in the cylinders 30 and 32, and in the sleeve 82 and the chamber 116 communicating respectively with these cylinders, there is no perceptible movement of the pistons 94 and 122. However, should there occur an unequal pressure in the cylinders 30 and 32, due to leakage or other causes, the pistons 94 and 122 immediately shift to compensate for the differential in pressure in the cylinders to the end that the brakes may be actuated with substantially equal effect; and should the differential of pressure in the respective cylinders 30 and 32 be of such magnitude as to render one entirely ineffective, the other is in no way impaired, and because of this at least one set of brakes is retained in operative condition.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid pressure producing device comprising a pair of cylinders arranged concentrically to one another, a piston reciprocable in each of the cylinders, a single actuating means for both of the pistons, and cooperative devices carried by the pistons for equalizing pressure in the cylinders.

2. A fluid pressure producing device comprising a pair of cylinders arranged concentrically to one another, a piston reciprocable in each of the cylinders, a single actuating means for both pistons, and shiftable cooperative members carried by the pistons for equalizing pressure in the cylinders.

3. A fluid pressure producing device comprising a pair of cylinders arranged concentrically to one another, a piston reciprocable in each of the cylinders, a single actuating means for both pistons, a sleeve on one of the pistons, a chamber in the other piston, and opposed pistons reciprocable in the sleeve and chamber for equalizing pressure in the cylinders.

4. A fluid pressure producing device comprising a pair of cylinders arranged concentrically to one another, pistons reciprocable in each of the cylinders, a single actuating means for both pistons, a chamber in one of the pistons, a sleeve on the other piston communicating with the chamber, and opposed spring-pressed pistons reciprocable in the chamber and sleeve respectively for equalizing pressure in the cylinders.

5. A fluid pressure producing device comprising a pair of cylinders of different diameters arranged concentrically to one another, a piston reciprocable in each of the cylinders, a single actuating means for both pistons, a sleeve on the piston in the larger cylinder having a port communicating with the larger cylinder, a chamber in the piston in the smaller cylinder having a port communicating with the smaller cylinder, and cooperative pistons reciprocable in the sleeve and chamber.

6. A fluid pressure producing device comprising a pair of cylinders of different diameters arranged concentrically to one another, a piston reciprocable in each of the cylinders, a single actuating means for both pistons, a sleeve on the piston in the larger cylinder having a port communicating with the larger cylinder, said sleeve abutting the piston in the smaller cylinder, a chamber in the piston in the smaller cylinder having a port communicating with the cylinder, a spring-pressed piston in the smaller cylinder, a spring-pressed piston in the chamber, sleeve, a spring-pressed piston in the chamber, the pistons in the sleeve and chamber cooperating with one another to equalize pressure in the cylinders.

7. A fluid pressure producing device comprising a reservoir having two compartments, a pair of cylinders of different diameters arranged concentrically to one another at the base of the reservoir, the larger cylinder being supplied from one of the compartments and the smaller cylinder being supplied from the other compartment, a single actuating means for both pistons, a sleeve on the piston in the larger cylinder having a port providing a communication between the sleeve and the larger cylinder, said sleeve abutting the piston in the smaller cylinder, a chamber in the piston in the smaller cylinder having a port providing a communication between the chamber and the smaller cylinder, a spring-pressed piston in the sleeve, and a spring-pressed piston in the chamber cooperating with the piston in the sleeve to equalize pressure in the cylinders.

8. In a braking system, a fluid pressure producing device comprising a reservoir including two compartments, a pair of cylinders of different diameters arranged concentrically to one another at the base of the reservoir, the larger cylinder having ports providing communications between one of the compartments and the cylinder, the small cylinder having ports providing communications between the small cylinder and the other compartment of the reservoir, fluid pressure actuated motors connected to each of the cylinders, a piston reciprocable in each of the cylinders, a single actuating means for both the cylinders, and shiftable means carried by the pistons for equalizing pressures in the cylinders.

9. In a braking system, a fluid pressure producing device including a reservoir having two compartments, a pair of cylinders of different diameters arranged concentrically to one another at the base of the reservoir, one of the cylinders being supplied with fluid from one of the compartments and the other cylinder being supplied with fluid from the other compartment, fluid pressure actuated motors operatively connected to each of the cylinders, a piston reciprocable in each of the cylinders, a single actuating means for both of the pistons, a sleeve on the piston in the larger cylinder provided with a port communicating with the larger cylinder, a chamber in the piston in the smaller cylinder provided with a port communicating with the smaller cylinder, a spring-pressed piston in the sleeve, and a spring-pressed piston in the chamber, the piston in the sleeve and the piston in the chamber cooperating with one another to equalize pressures in the cylinders.

WALLACE F. OLIVER.